May 23, 1961 A. C. SIM 2,985,807

SEMI-CONDUCTOR DEVICES

Filed Nov. 6, 1958

*Inventor*

A.C. SIM

*By* [signature] *Attorney*

2,985,807
Patented May 23, 1961

2,985,807

SEMI-CONDUCTOR DEVICES

Alan Coudray Sim, London, England, assignor to International Standard Electric Corporation, New York, N.Y., a corporation of Delaware Filed Nov. 6, 1958, Ser. No. 772,315

Claims priority, application Great Britain Nov. 14, 1957

4 Claims. (Cl. 317—236)

This invention relates to improvements in or relating to semi-conductor devices of the electrically-formed point contact variety.

The principal object of this invention is to enable electrical-forming processes to be carried out with reduced or eliminated thermal effects attendant with such processes.

According to the invention there is provided wire for the manufacture of electrically-formed point-contact semi-conductor device cat-whiskers made from an alloy of tin and silver, in which the proportions of tin and silver are such that the wire has a melting point in the temperature range of 400° C. to 550° C.

The nature of the invention will be better understood from the following description read in conjunction with the accompanying drawings in which.

It is well known in the production of semi-conductor devices of the electrically-formed point contact variety, to utilise the thermal effects accompanying electrical-forming to convert a zone of material within a semi-conductor body, for example N type germanium, into a zone of P type germanium so that a rectifying barrier is formed between them.

In such devices cat-whiskers of a neutral type are used, that is to say that neither N nor P type impurities are present in the material from which the cat-whisker is made, and the effects of thermal conversion are solely relied upon to convert the conductivity type of the material within the zone from N to P.

There is some evidence that the presence of some non-significant impurity (such as copper) may be necessary for this conversion to take place. The extent and properties of the P type region depend on the temperatures produced by the forming current and its duration. Thermal conversion effects become pronounced when temperatures in excess of 650° C. are reached during electrical forming, and even more pronounced when the temperature is aproximately equal to, or greater than, the melting temperature of the germanium.

Figure 1:
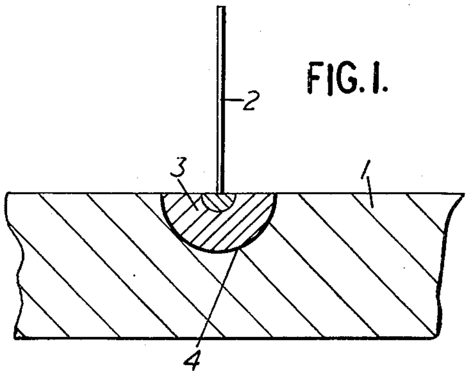
Fig. 1 shows a large scale sectional diagram of an electrically-formed point contact device wherein the cat-whisker used is of a neutral type which means that the material is free of significant impurities.

A device of the latter described type is shown in Fig. 1, which shows the condition after electrical forming of an N-type germanium body 1, beneath the tip of a cat-whisker 2 made from a wire of neutral material. In this device the cat-whisker is alloyed to the germanium body in the electrical-forming process and a small zone 3, beneath the cat-whisker is changed to germanium with P type properties by thermal conversion, and a rectifying barrier 4, is formed between the body and the zone.

The number of minority carriers injected into region 1 by a thermally converted zone such as 3 is relatively small, and this results in only small forward direction currents during operation of the device. In considering forward direction currents obtainable with electrically-formed point contact devices, those of the type just described are considered inferior to devices wherein the cat-whisker has either been made of a wire made of a P type impurity, or a wire of neutral material which has been "doped" with a significant P type impurity such as, for example, gallium or indium. The term "doping," as used herein, means the inclusion of a significant impurity in the wire from which a cat-whisker has been made, or the application of a signficant impurity onto a surface or surfaces of the wire by, for example plating or evaporation techniques. The number of minority carriers which originate from a P type zone produced by a "doped" whisker is greater, and thus the forward direction current characteristics of the device are improved, and a superior device is obtained.

Figure 2:
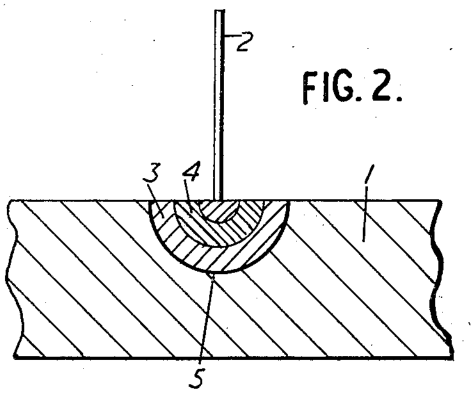
Fig. 2 shows a large scale sectional diagram of an electrically-formed point contact device wherein the cat-whisker used is "doped" with a significant P type impurity.

In Fig. 2, there is shown the condition of an N type germanium semi-conductor body 1, beneath the alloyed tip of a cat-whisker 2 made from a wire "doped" with P-type impurity material. In this device it will be seen that two P-type zones are produced within the body, the outer zone 3 (produced by thermal conversion of the material) surrounds the zone 4 (produced by migration of the impurity from the cat-whisker). Thus the zone 4, containing a high concentration of acceptors is separated from the junction or barrier 5, by a zone 3, containing a relatively low concentration of acceptors and hence the high injection efficiency of the heavily "P" doped zone 4, is reduced by the presence of the internal zone 3 of lower acceptor concentration, and the expected increase in forward direction current due to a zone strong in minority carriers (as compared with a thermally produced zone) is not fully met. Thus the effects of thermal conversion in this type of device are undesirable.

The effects outlined above are more marked when the cat-whiskers used have high melting temperatures, i.e. melting temperatures higher than or aproximately equal to the melting temperature of the semi-conductor body; furthermore at high electrical-forming temperatures, the surface of the semi-conductor material becomes contaminated by condensation of vaporised materials. If however the whisker material is chosen such that its melting temperature is lower than that of the semi-conductor body, then the molten region below the cat-whisker will be cooler and the P-type zone produced by thermal conversion will be reduced in extent, the surface of the semi-conductor material becomes less contaminated by condensation of vapourised materials, and this results in greatly improved reverse resistances. Such is the case when aluminium wire cat-whiskers are used (aluminium being in itself a P-type impurity) on N-type germanium since their melting points are 659° C. and 932° C. respectively. Devices utilising aluminium wire whiskers are found to produce forward current characteristics far superior to devices using other general types. Unfortunately aluminium does not alloy satisfactorily with germanium and electrical-forming processes do not produce a strong weld between whisker and semi-conductor body. Such structures are mechanically fragile and susceptible to mechanical shock and hence are, as yet, of no commercial interest. It should be added that, whilst low-forming temperatures are advantageous for reducing or eliminating contamination of N-type semi-conductor material it is also advantageous for the same reasons when P-type semi-conductor material is used. In order to provide a cat-whisker that combines mechanical strength with low temperature melting it is proposed to provide one manufactured from a wire of a low "melting-temperature" alloy which may also be suitably "doped" with a P-type impurity material such as indium or gallium for use with N-type semi-conductor material, or "doped" with an N-type impurity material such as phosphorus or arsenic for use with P-type semi-conductor material.

Since extraneous thermal effects in germanium can be avoided by keeping the temperatures attendant with electrical forming between 400° C. and 550° C. The proposed alloy should have a melting temperature within this range; preferably however, the melting temperature should be within the temperature range of 490° C. to 510° C. Many alloys could be utilised to provide melting temperatures of this order but in view of the inert properties of tin and silver, an alloy composed of these materials is preferred, and in particular, one in which the proportions of tin and silver are such that the melting point is 500° C. would appear to be optimum. It is considered that these alloys would retain adequate strength for the manufacture of whiskers and for withstanding the mechanical shocks attendant with everyday usage of a device or devices in which they may be employed, since germanium and both tin and silver bond well.

Cat-whiskers made from alloy wires of the type having melting points within the temperature ranges specified herein, and which are free of significant impurity materials may be utilised in the manufacture of point-contact semi-conductor devices in which, for example, either an acceptor type impurity material or a donor type impurity material has been included between the surface of the semi-conductor body and the tip of the alloy whisker prior to electrical-forming to alloy the whisker to the semi-conductor body. In such an arrangement a zone of opposite conductivity type material is formed within the semi-conductor body due to the migration therein of the impurity material interposed between the whisker tip and the body. It will readily be understood that in such devices, the low-temperatures involved in the forming will substantially eliminate contamination of the surface material of the body due to vapourisation of semi-conductor and whisker material which would otherwise take place if the forming temperature were higher.

The possibilities of the proposals contained herein are considerable; in their implementation it will be possible to produce alloy junction type semi-conductor devices such as diodes which have physical, electrical and operating characteristics superior to previously known electrically-formed point contact diodes, and yet the advantages of ease of manufacture will be maintained in view of the fact that well established electrical-forming techniques may still be employed in their production.

The low melting-temperature alloy cat-whiskers described herein may well be used with the same advantages in the production of junction transistors, with the added advantage that the alloy junctions formed would be quite small as compared with those produced in the more conventional types. It will readily be understood that the reduction in size of the junction will be due, in the main, to the avoidance of a thermally converted zone being present and the smallness of the amount of cat-whisker material alloyed with the semi-conductor material itself.

While the principles of the invention have been described above in connection with specific apparatus, it is to be clearly understood that this description is made only by way of example and not as a limitation on the scope of the invention.

What is claimed is:

1. A wire made from an alloy of tin and silver for the manufacture of electrically-formed point-contact semi-conductor device cat-whiskers, characterized in that at least one end of the wire is doped with an impurity material and that the proportion of tin and silver are such that the wire has a melting point within the temperature range of 400° C. and 550° C.

2. A wire for the manufacture of electrically-formed point-contact semi-conductor device cat-whiskers as claimed in claim 1 in which the impurity material is chosen from the group comprising phosphorus and arsenic.

3. A wire for the manufacture of electrically-formed point-contact semi-conductor device cat-whiskers as claimed in claim 1 in which the impurity material is chosen from the group comprising indium and gallium.

4. A semi-conductor device in which the effects of the thermal conversion of the semi-conductor are substantially avoided, comprising a body of semi-conductor material and a cat-whisker electrode made from an alloy of tin and silver having a melting point between 400 degrees C. and 550 degrees C. said cat-whisker and said body being interconnected with an alloyed junction.

References Cited in the file of this patent

UNITED STATES PATENTS 2,583,009 Olsen ---------------- Jan. 22, 1952